US010006988B2

(12) United States Patent
Giunta et al.

(10) Patent No.: US 10,006,988 B2
(45) Date of Patent: Jun. 26, 2018

(54) METHOD AND KINEMATIC CALIBRATION SYSTEM FOR MEASURING DISPLACEMENTS AND VIBRATIONS OF OBJECTS/STRUCTURES

(71) Applicant: ENI S.p.A., Rome (IT)

(72) Inventors: Giuseppe Giunta, San Donato Milanese (IT); Andrea Monti-Guarnieri, Como (IT)

(73) Assignee: ENI S.p.A., Rome (IT)

( * ) Notice: Subject to any disclaimer, the term of this patent is extended or adjusted under 35 U.S.C. 154(b) by 390 days.

(21) Appl. No.: 14/693,984

(22) Filed: Apr. 23, 2015

(65) Prior Publication Data
US 2015/0309160 A1    Oct. 29, 2015

(30) Foreign Application Priority Data
Apr. 24, 2014  (IT) .............................. MI2014A0771

(51) Int. Cl.
*G01S 7/40*    (2006.01)
*G01H 9/00*    (2006.01)
(Continued)

(52) U.S. Cl.
CPC ................. *G01S 7/40* (2013.01); *G01H 9/00* (2013.01); *G01S 7/023* (2013.01); *G01S 7/354* (2013.01);
(Continued)

(58) Field of Classification Search
CPC ........... G01S 7/023; G01S 7/4021; G01S 7/40
(Continued)

(56) References Cited

U.S. PATENT DOCUMENTS 4,300,121 A * 11/1981 Fritzsche ............... G08B 21/10
                                                    340/601
5,828,331 A * 10/1998 Harper ..................... G01H 9/00
                                                    342/192

(Continued)

FOREIGN PATENT DOCUMENTS

EP       2 560 021 A1    2/2013
WO    WO 2013/118121 A1   8/2013

OTHER PUBLICATIONS

F. Bovenga, A. Refice and G. Pasquariello, "Using corner reflectors and X-band SAR interferometry for slope instability monitoring," 2012 Tyrrhenian Workshop on Advances in Radar and Remote Sensing (TyWRRS), Naples, 2012, pp. 114-120.*

(Continued)

*Primary Examiner* — Marcus E Windrich
(74) *Attorney, Agent, or Firm* — Oblon, McClelland, Maier & Neustadt, L.L.P.

(57) ABSTRACT

A method and system are described for measuring displacements and vibrations of an object/structure. The method includes transmission of at least one radar wave by a single radar device positioned at a predefined distance from a receiver device applied on the object/structure, reception, by the radar device, of a complex signal consisting of the sum of the signal reflected from said receiver device and of one or more interfering signals generated by one or more corresponding targets substantially stationary and substantially positioned at the same distance from the radar device, separation of the interfering signals from the reflected signal. The separation includes calibration by induction, for a pre-determined period of time, of a vibrational motion having a known frequency and duration in the receiver device, which consequently operates as a calibration device, for obtaining an estimated value of the interfering signals.

10 Claims, 8 Drawing Sheets

(51) Int. Cl.
*G01S 7/35* (2006.01)
*G01S 13/58* (2006.01)
*G01S 7/02* (2006.01)
*G01S 13/08* (2006.01)

(52) U.S. Cl.
CPC ............ *G01S 7/4052* (2013.01); *G01S 13/08* (2013.01); *G01S 13/58* (2013.01); *G01S 2007/4095* (2013.01)

(58) Field of Classification Search
USPC .................................................. 342/159, 174
See application file for complete search history.

(56) References Cited

U.S. PATENT DOCUMENTS

| | | | | |
|---|---|---|---|---|
| 6,208,283 | B1* | 3/2001 | Murata | G01S 5/14 342/190 |
| 8,638,253 | B1* | 1/2014 | Dryer | G01S 7/003 342/107 |
| 8,963,732 | B2* | 2/2015 | Noon | G08B 21/18 340/540 |
| 2007/0085730 | A1* | 4/2007 | Tsunoda | G01R 29/0821 342/165 |
| 2008/0238776 | A1* | 10/2008 | Parsons | G01S 13/36 342/450 |
| 2009/0121888 | A1* | 5/2009 | Reeves | G01S 13/88 340/669 |
| 2010/0092916 | A1* | 4/2010 | Teixeira | A61C 17/20 433/103 |
| 2013/0044020 | A1* | 2/2013 | Dvorkin | G01H 1/003 342/28 |
| 2013/0113644 | A1* | 5/2013 | Nakagawa | G01F 23/2845 342/6 |
| 2015/0159632 | A1* | 6/2015 | Vangen | F03D 17/00 416/61 |

OTHER PUBLICATIONS

F. Bovenga, A. Refice and G. Pasquariello, "Using corner reflectors and X-band SAR interferometry for slope instability monitoring," 2012 Tyrrhenian Workshop on Advances in Radar and Remote Sensing (TyWRRS), Naples, 2012, pp. 114-120. (Year: 2012).*
Italian Search Report dated Jan. 8, 2015 in Italian Application MI20140771, filed Apr. 24, 2014 ( with English Translation of Categories of Cited Documents).

* cited by examiner

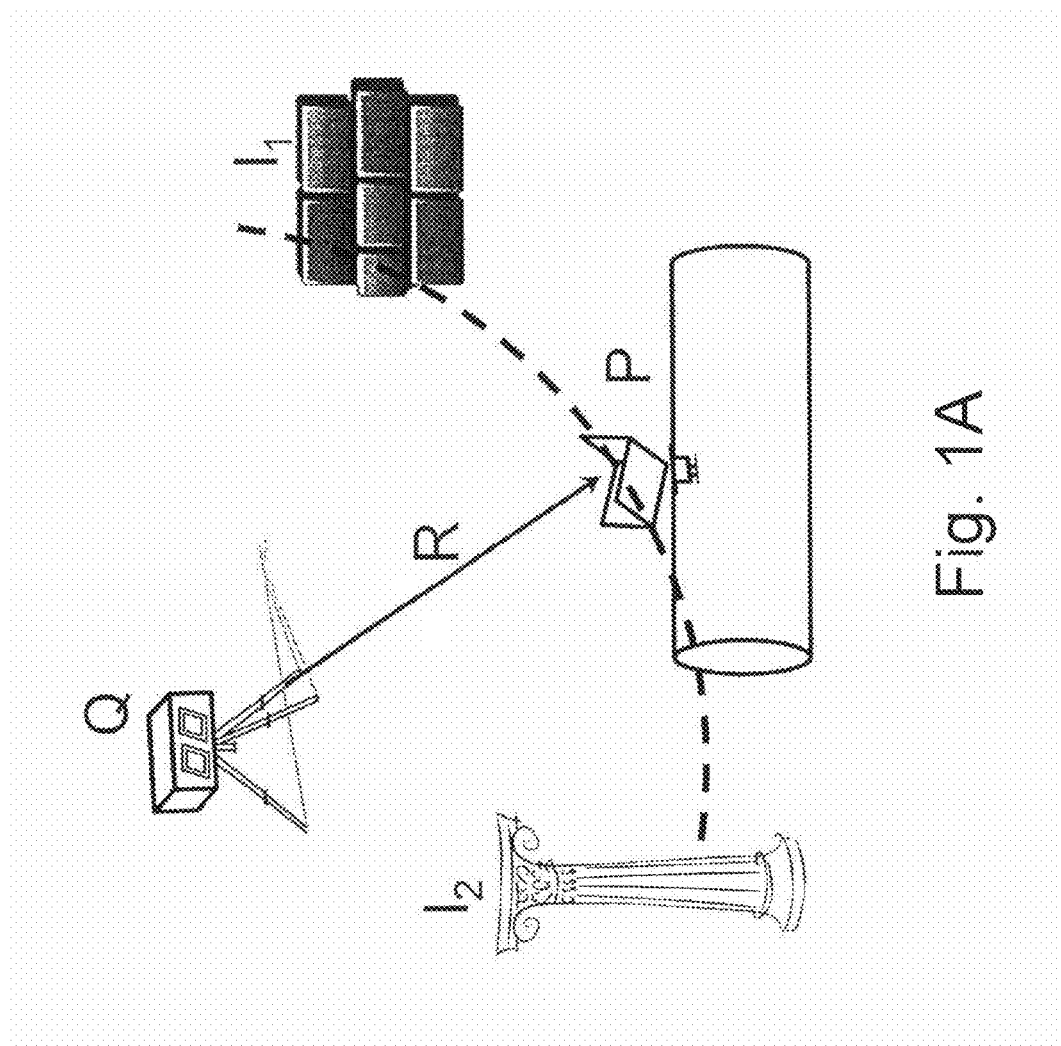

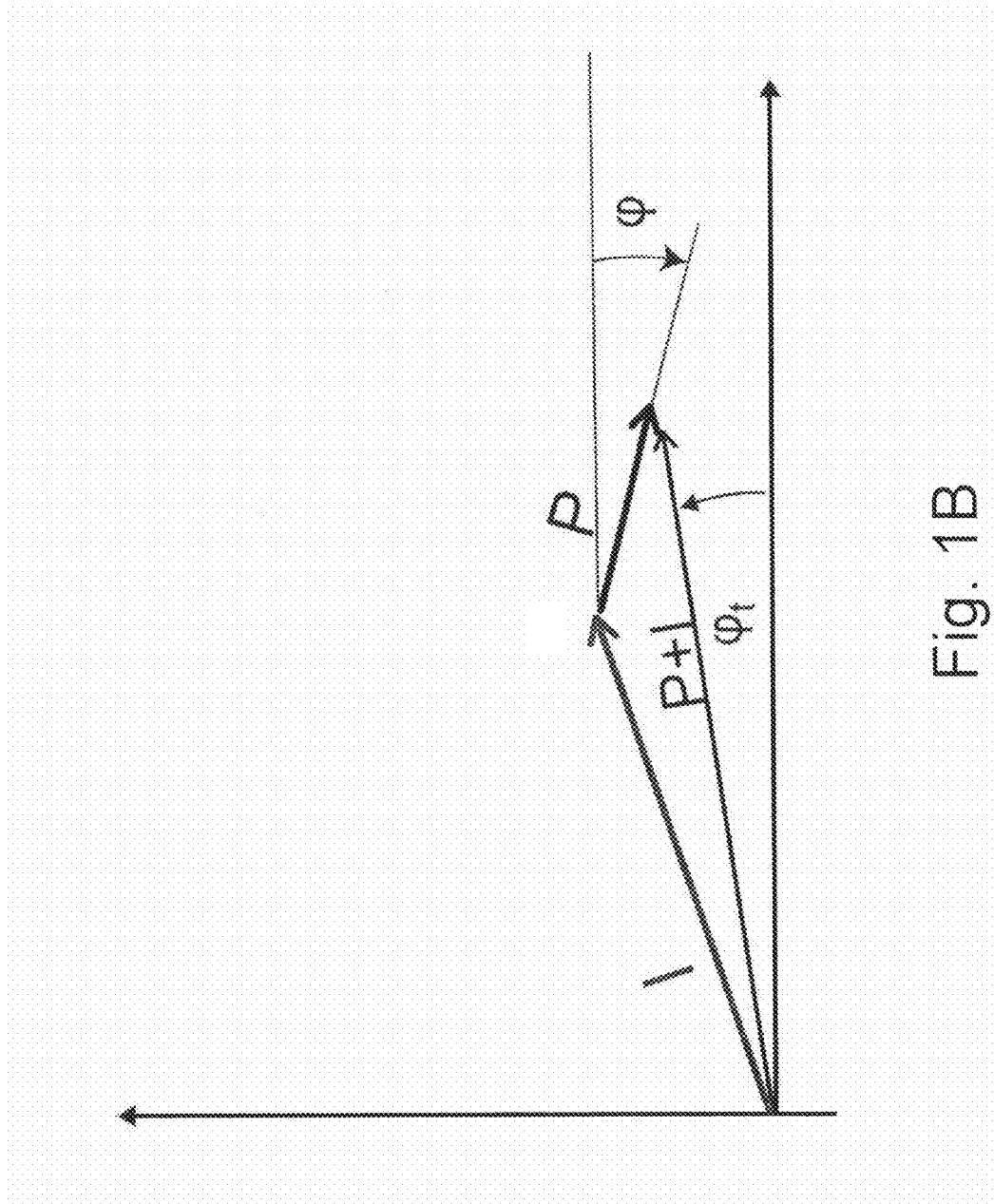

METHOD AND KINEMATIC CALIBRATION SYSTEM FOR MEASURING DISPLACEMENTS AND VIBRATIONS OF OBJECTS/STRUCTURES

The present invention relates to a method and a kinematic calibration system for measuring displacements and vibrations of objects/structures, in particular a method and a system which use a radar interferometry technique which provides, in real time, an estimation of the displacements, deformations and vibrations of objects/structures using simultaneous measurements effected by one or more radar devices positioned in one or more corresponding remote points with respect to the object/structure, consequently without requiring the installation of measurement and/or electrical equipment placed in direct contact with the object/structure to be measured.

The method and system according to the invention provide measurements of displacements and vibrations with a micrometric accuracy and sensitivity and with response times in the order of milliseconds. Possible application fields of this method and system relate to petrochemical installations, for example, gas compression stations, thermal power plants, dams and forced ducts, refineries, offshore platforms, wind turbines, bridges and viaducts, monuments, historical buildings, etc.

Among the radar-type systems currently used for measuring displacements of objects/structures, the following can be mentioned:

synthetic-aperture radar systems, such as that described, for example, in the document US 2011/0298655 A1. These systems, called "SAR" (acronym of Synthetic Aperture Radar), are capable of separating contributions in space by synthesis of a radar antenna having considerable dimensions. This synthesis is obtained by moving the radar sensor on a slide or with other devices, among which, for example, aeroplanes and satellites in the case of considerable distances. They are therefore cumbersome and costly devices which also require considerable time (from seconds to minutes) for every measurement acquisition, thus reducing the revisiting duration of the target, i.e. the object to be measured;

"active" systems (such as transponders) of the type described, for example, in the document EP 2382487 A1. These systems solve the problem of interference, using different codes and/or frequencies for each device, similar to what is used in the telecommunications industry for mobile systems. The functioning principle can be attributed to that of secondary radars for aeronautical use. The limits in the use of these systems are due to the fact that they are active and must therefore be installed in direct contact with the object/structure to be measured. These systems also emit electromagnetic fields and have a limited stability over long periods of time due to thermal drifts and aging;

simultaneous optical/radar measurement systems of the type described, for example, in the document US 2006/0260407 A1, provided with one or two receiver devices for eliminating errors in the vibration field. These systems, however, do not solve the problem of interference;

inverse "SAR" radar (or "ISAR") systems of the type described, for example, in the document EP 1178330 A1, which mediate on relatively lengthy times, displacements comparable to a wavelength. Inverse SAR systems exploit a significant displacement of the target in an "across range" direction for distinguishing it from possible interferences. This leads to effective applications in a military or automobile context, but is of no interest for assessing vibrations, in which the target composed of the object/structure to be measured, substantially maintains the same position;

space-time "STAP" signal processing systems (Melvin, W. L., "A STAP overview", *Aerospace and Electronic Systems Magazine, IEEE*, vol. 19, no. 1, pages 19-35, January 2004; Ender, J., "Space-time processing for multichannel synthetic aperture radar", *Electronics & Communication Engineering Journal*, February 1999). Also in this case, it is assumed that the movement of the target extends for numerous wavelengths, i.e. for many centimeters.

The technical problem inherent in the simultaneous interferometric radar measurement of displacements and vibrations of numerous targets is generally the impossibility of the radar system of distinguishing reflected signals ("echoes") coming from targets localized at the same distance. This condition is illustrated, for example, in FIG. 1A of the enclosed drawings, in which the echoes of the target P, which is the object/structure whose displacement is to be measured, are isochronous with respect to those of the interfering targets $I_1, I_2$ positioned at the same distance from the radar device Q. The overlapping of the three reflected signals creates an interference which prevents a correct measurement of the displacement of the target P. An example of the effect of this interference is shown in FIG. 1B in which the movement of the target P, for example of the sinusoidal type, is distorted and attenuated in amplitude.

Methods and systems according to the known art, as indicated above, separate the various contributions, which are based on two distinct principles:

by means of directional radar antennas;

by the space-time processing of the signals.

In the case of directional radar antennas, the antenna limits the "visibility" of the radar to an extremely narrow angle range around the target P. An antenna having a length L has an angular aperture $\Delta\Psi$ correlated to the diffraction principle:

$$\Delta\psi = \frac{\lambda}{L} \quad (1)$$

wherein $\lambda$ is the radar wavelength. For example, in order to eliminate the interference of a target placed at a distance of 1 meter from the useful target and at 50 meters from the radar, the angular aperture must be equal to $\Delta\Psi \ll \frac{1}{50}$ rad, and therefore the length must be equal to $L \gg 50\lambda$. A drawback of the system with directional radar antennas is due to the dimension/encumbrance of the radar system (various meters) which can become critical, in addition to the cost, weight, etc.

"SAR" systems attenuate the problem of the angular aperture by using a synthetic antenna, or by moving a radar in multiple positions, effecting a measurement for each position and then recombining the measurements by means of numerical processing of the signals. These systems, however, do not solve the problem of encumbrance (the total aperture does not change) and also require a much longer time for effecting the displacement/vibration measurement, reducing the revisiting time of the scenario.

Furthermore, it can be observed that equation (1) is valid in the hypothesis of a "far field" i.e. for targets positioned at much greater distances than the Fraunhofer distance $d_r$:

$$d_r >> \frac{2L^2}{\lambda} \qquad (2)$$

which, in the example indicated above (L»50λ) would lead to a distance $d_r$ in the order of hundreds of meters. For shorter distances, there is no desired separation of the interfering contributions.

In the case of systems that fall within the condition expressed by equation (2), a space-time processing of the radar signals is exploited for distinguishing a moving target with respect to a stationary or almost stationary target. In this condition, inverse radar systems "ISAR" which use the motion of the target to form a synthetic aperture are also considered. These latter systems require a predominant linear motion characteristic, i.e. a significant displacement of the target, and they are not suitable for vibrational motions (typically harmonic).

Also in the case of time processing such as "MTI" (acronym of "moving target indicator") techniques, the movement extension must be significantly greater than the wavelength λ and is therefore in the order of various centimeters. Consequently, not even are these techniques suitable for measuring displacements and vibrations of a small entity.

The objective of the present invention is therefore to provide a method and a kinematic calibration system for measuring displacements and vibrations of objects/structures, in particular a method and system which use a radar interferometry technique, capable of solving the drawbacks of the known art indicated above in an extremely simple, economical and particularly functional manner.

The method and kinematic calibration system for measuring displacements and vibrations of objects/structures according to the present invention allow the contribution of the vibrational motion of a certain target of interest to be separated from that of one or more further stationary or almost stationary targets. This separation phase is obtained by inducing, in the target of interest, a known vibrational motion, for example repetitive, and sufficiently extensive as to be separated from the contributions of the further almost stationary targets.

With a suitable processing of the radar signals, the contribution of the interfering targets can be estimated and is then removed, eliminating the interference itself. This removal is effected once the vibration intentionally induced in the target, which has a limited duration, has been deactivated. The characterizing aspect relates to the whole kinematic calibration procedure, including both the vibrating target (actuator-shaker), and the processing suitable for estimating and cancelling the interfering contribution in the measurement scenario. It is important to note that the radar measurement system functions if the interfering target or targets move very slowly, so that this motion can be reconstructed by measurements at periodic intervals.

These purposes according to the present invention are achieved by providing a method and kinematic calibration system for the measurement of displacements and vibrations of objects/structures as specified in the independent claims.

Further characteristics of the invention are highlighted by the dependent claims which are an integral part of the present description.

The characteristics and advantages of a method and kinematic calibration system for the measurement of displacements and vibrations of objects/structures according to the present invention will appear more evident from the following illustrative and non-limiting description, referring to the enclosed schematic drawings in which:

FIG. 1A is a schematic view illustrating a simultaneous interferometric radar measurement system of displacements and vibrations of a plurality of objects or targets;

FIG. 1B is a diagram showing the effect of the interference in a measurement effected by means of a system such as that of FIG. 1A, wherein the radar signal is represented by a complex vector P+I, equal to the sum of the target contribution (vector P) and of the interfering signals (vector I). The motion of the target can be identified from the phase φ, which differs from the measured phase $\varphi_t$ in the presence of the interfering contributions and therefore leads to an error;

FIGS. 2A and 2B both show the effect of interference on the radar estimation of the vibration, wherein FIG. 2A illustrates the vibration measured by the radar with (curve B) and without (curve A) interference, whereas FIG. 2B shows the spectrum of the vibration measured in both cases (with and without interference);

Figure 6:
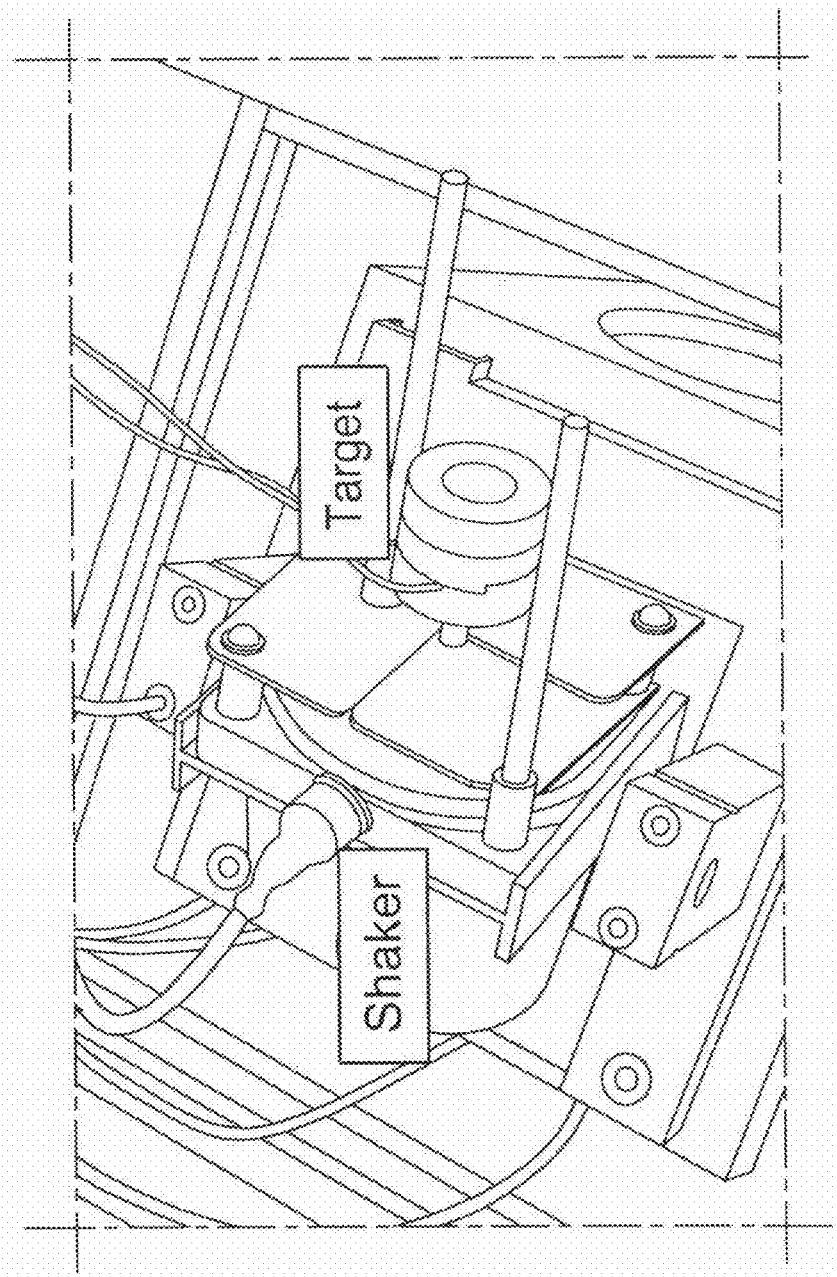
Figures 7A, 7B:
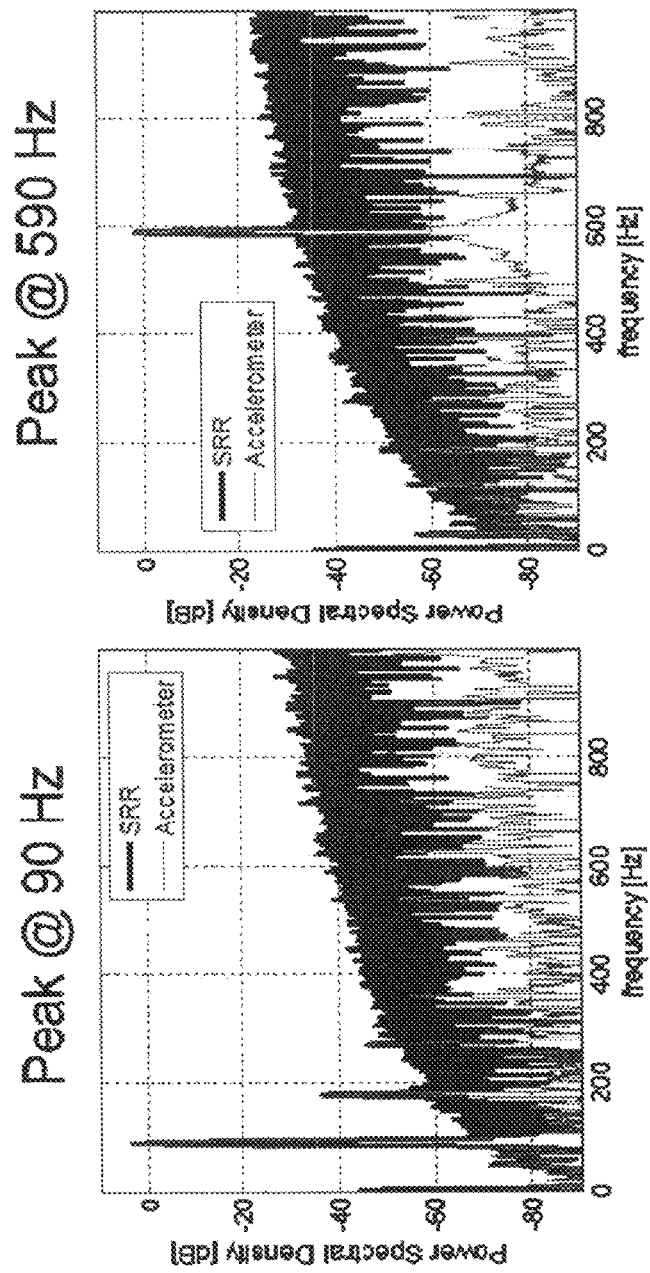

FIG. 6 shows a system that verifies the performances of the kinematic calibration method according to the present invention, which estimates the vibration of a target assembled on a precision actuator-shaker for the "sweep frequency" test; and FIGS. 7A and 7B show an estimation of the measurement of two vibrations equal to 90 Hz (FIG. 7A) and 590 Hz (FIG. 7B), with a comparison of the measurement obtained by the radar system (SRR) with the accelerometric measurement. The optimum vibration frequency of the calibration target can be accurately determined thanks to the measurements indicated.

With reference to the figures, these show a method and kinematic calibration system for measuring displacements and vibrations of objects/structures according to the present invention, in particular a method and system which use a radar interferometry technique. The precise estimation of the position and displacement of an item/structure (indicated with P) using a single radar device (indicated with Q) with the interferometric technique exploits a knowledge of the reflection phase of the radar waves (having removed the ambiguity of multiples of 2π) for determining the "LOS" (acronym of "line of sight") distance $R_{LOS}(t)$ between the radar device Q and the item/structure P:

$$R_{LOS}(t) = -\frac{\varphi(t)}{4\pi}\lambda \quad (3)$$

wherein φ is the phase of the received signal, after demodulation. Said phase φ is measured periodically, i.e. with repetitions of transmissions, in correspondence with the times $t_n$:

$$t_n = \frac{2R}{c} + nT \quad (4)$$

wherein R is the distance (approximated to the resolution) of the item/structure P from the radar device Q, c is the electromagnetic wave propagation speed, T is the repetition period of the radar signal and n is an integer index.

The measurement of the phase φ, on the basis of equations (3) and (4), allows the variation in the distance $R_{LOS}(t)$ between the radar device Q and the item/structure P, to be known, in multiple time ranges of the repetition period T, as per equation 4. This measurement of the phase φ, can be altered by the presence of various interfering targets $I_1$, $I_2$ positioned at the same distance from the radar device Q or, in other words, within the resolution of the same radar device Q, with respect to the object/structure P, as shown in FIG. 1A.

FIG. 1A, in fact, shows two interfering targets $I_1$, $I_2$ positioned at the same distance, and therefore isochronous, with respect to the object/structure P, or "useful" target. As the radar device Q is a linear system, the result of the interference is given by the sum of the contribution of the object/structure P, represented as a vector in FIG. 1B, and the interfering contribution I, represented with a different vector in the same FIG. 1B. The amplitudes of the vectors P and I are proportional to the reflectivity, or "radar cross section", of the object/structure P and interfering targets $I_1$, $I_2$ respectively, in the measurement field. The phase of the vector P forms the useful signal φ, whereas the phase of the interfering vector I is not generally known, depending on the position, amplitude and reflection coefficient of all the targets $I_n$ forming the interference. The result of the measurement is the phase of the sum P+I of the two contributions, i.e. $\varphi_r$, that can differ considerably from the contribution φ to be measured, depending on the amplitudes of P and I, as shown in FIG. 1B.

Figure 2A:
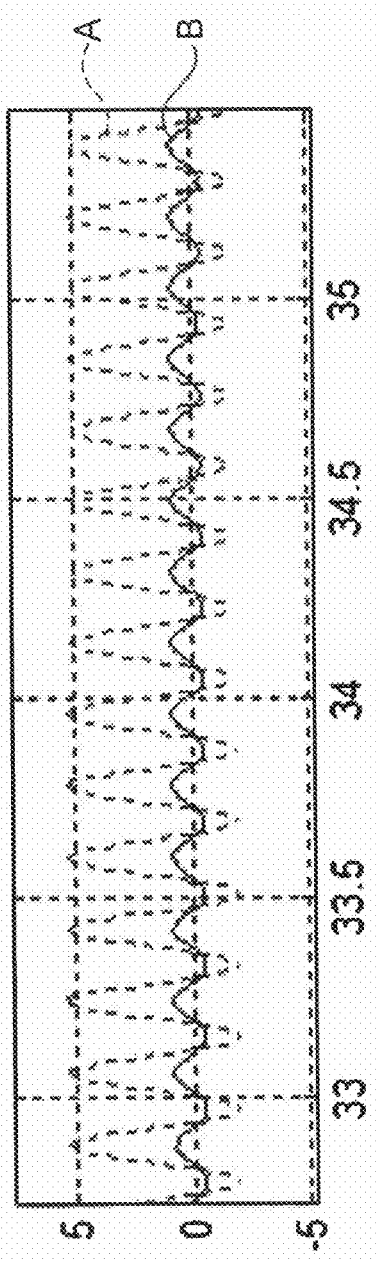
Figure 2B:
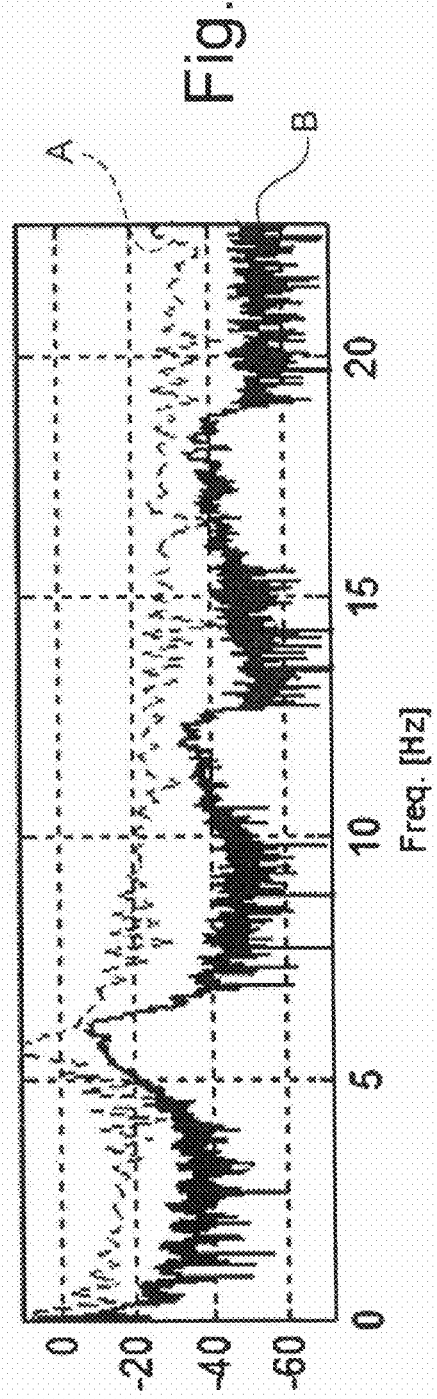

An example of an estimation of a sinusoidal vibration in the presence of interference is shown in FIGS. 2A and 2B. The ideal motion (curve A) is strongly distorted (curve B) and higher harmonic components are generated.

The separation of the interfering contribution is relatively easy, using techniques known in literature, if the target moves significantly, in the order of much more than half a wavelength, but it is not easy if the motion is extremely reduced. The demodulated complex radar signal s(t) is the sum of the contribution of the interfering targets $I_1$, $I_2$ and object/structure P in vibrational movement, and can be decomposed as follows:

$$s(t) = A_P e^{j\varphi_P(t)} + A_I e^{j\varphi_I} \quad (5)$$

The estimation of the interfering contribution, i.e. $A_I e^{j\varphi_I}$, is effected by means of a statistical technique based on a knowledge of the phase term $\varphi_P(t)$ due to the vibrational movement induced in equation (5). An example of the two contributions $A_P e^{j\varphi_P(t)}$ e $A_I e^{j\varphi_I}$ of equation (5) is shown in the range-frequency graph of FIG. 5, which indicates the Fourier transform of the demodulated complex radar signal s(t) in different range positions.

Figure 3:
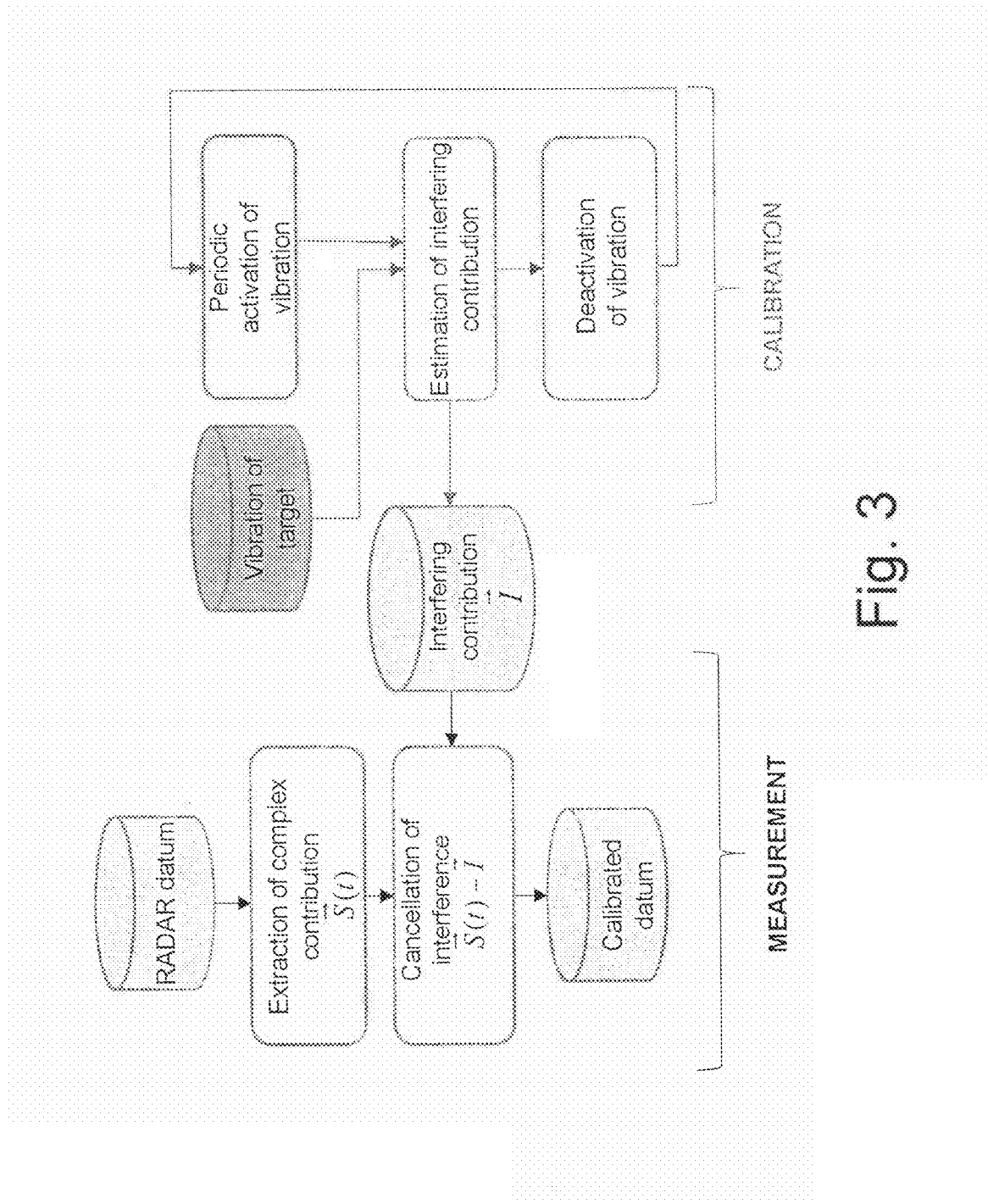
FIG. 3 illustrates the method for the remote measuring of vibrations and displacements with radar systems according to the present invention, in which said measurement removes the interference from stationary targets obtained by means of a suitable periodic calibration technique.

The complete calibration procedure shown in FIG. 3 consists in two phases:
1. calibration phase. A vibration is induced in the object/structure P by means of a suitable actuator device. The frequency and duration of said vibration is known and is measured, for example, in the absence of interferences. In this case, the complex contribution P (FIG. 1B) is known for each instant of time during the measurement. This information can be exploited for estimating the interfering contribution I, assuming that it is kept constant, or moves only slightly with respect to the wavelength, for the whole duration of the measurement, as can be seen in equation (5);
2. measurement phase. The interfering contribution I thus determined is subtracted from the signal measured by the radar device Q, obtaining a signal without interference, whose phase is used for measuring the vibration as per equation (3) and equation (4).

The calibration phase is repeated periodically, as indicated in FIG. 3, for updating the estimation of the interfering contribution I with respect to possible changes in the interference (slow movements, amplitudes, etc.).

Figure 4:
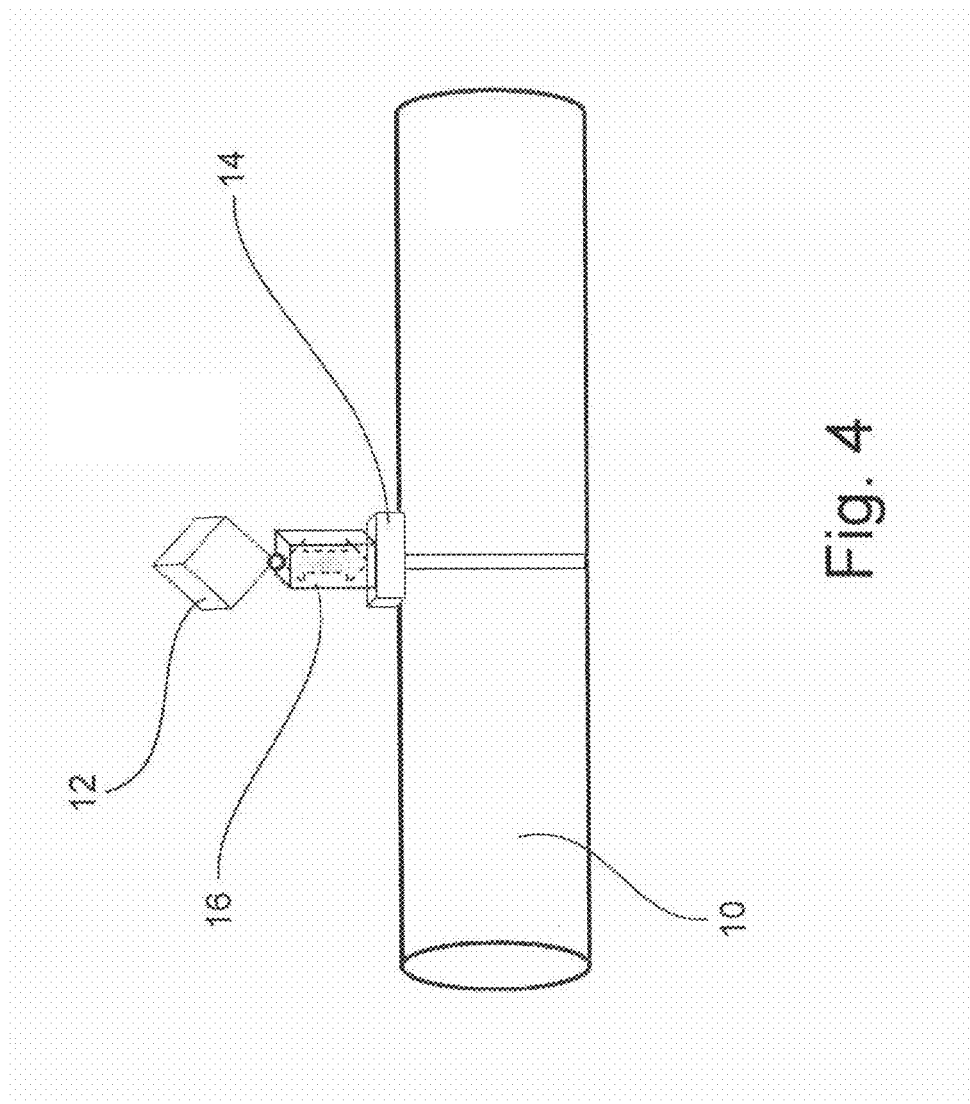
FIG. 4 represents the scheme of a calibration device capable of generating vibrations with a known frequency, provided with anchoring means to the structure to be monitored. In this embodiment example, the calibration device consists of a reflector and an actuator-shaker or vibrator and the above anchoring means.

The kinematic calibration device according to the invention is represented in FIG. 4. Said calibration device consists of:
- a reflector element 12 of the trihedral type, or produced with other geometrical forms or construction details so as to be visible by the radar device Q;
- hooking or anchoring means 14, configured for making the calibration device (10) integral with the object/structure P whose movement is to be measured;
- a vibration mechanism 16 which allows the target 12 to vibrate with its own motion with respect to the object/structure P whose movement is to be measured.

The vibration mechanism 16 can be mechanically activated or powered by batteries, as for systems used in mobile phones, and must be periodically activated and deactivated. When the vibration mechanism 16 is deactivated, the reflector element 12 moves integrally with the object/structure P. The mechanism 16 is produced so as to periodically repeat the same vibration, with a better precision than the wavelength.

The vibration mechanism 16 can operate according to different modes. An example of a vibration can consist in a sinusoidal motion generated by the vibration mechanism 16 by a battery motor and a cam. In the case of linear motion (or similar), it is well-known that the adapted filter is represented by the Fourier transform.

Figure 5:
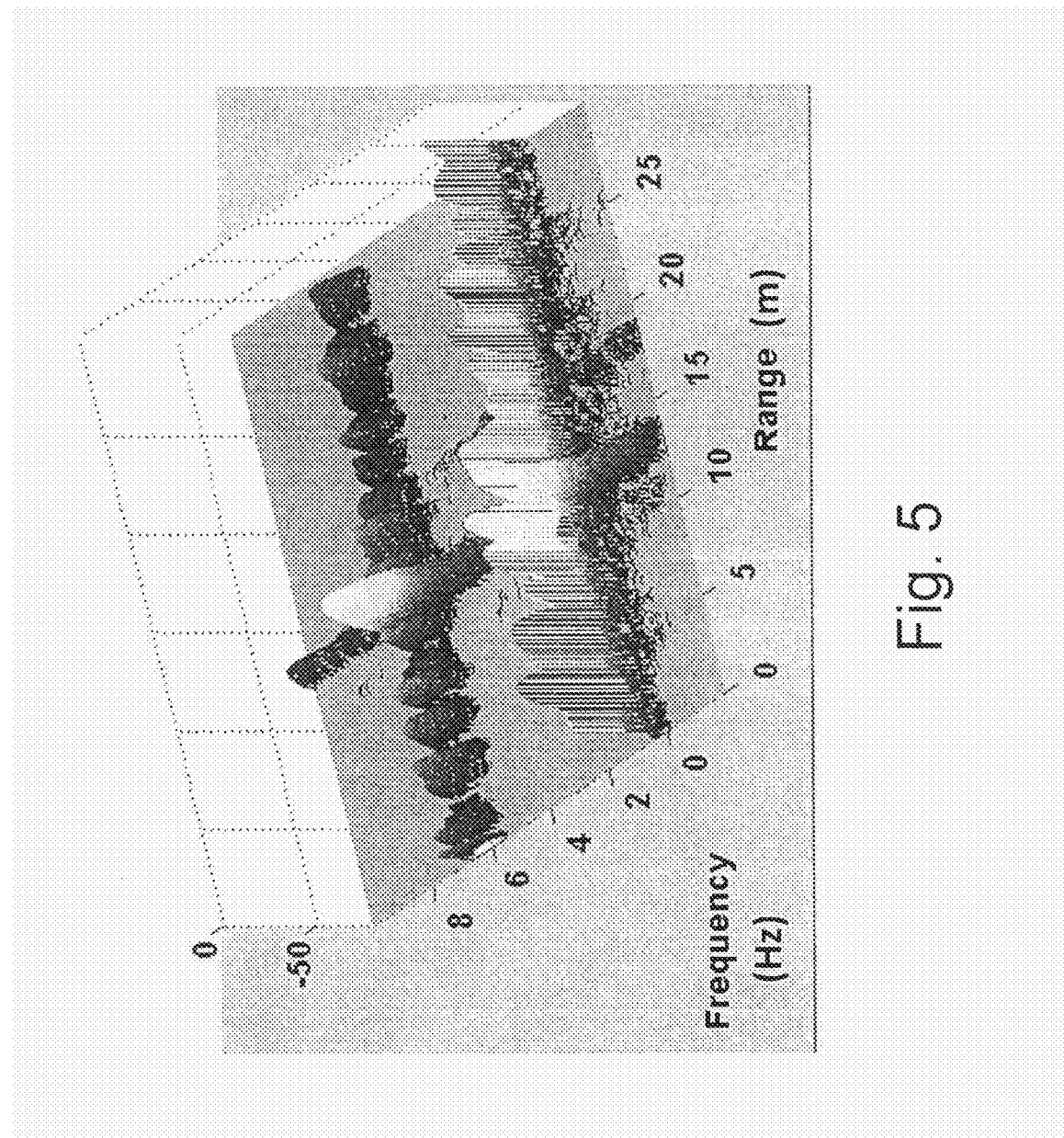
FIG. 5 is a graph in which, representing the radar signal in the range, frequency domain, the contributions of the motion of the vibrating system (shaker) in the calibration phase (frequency 6 Hz) can be distinguished with respect to those due to interfering targets in slow movement (almost zero frequency)

FIG. 5 shows the module of said Fourier transform, measured for each possible distance ("range") between target and radar system. It can be immediately observed that this result allows the contribution of the vibrating target, that can be identified at a distance of about 12 m and a frequency of 6 Hz, to be separated with respect to all the other contributions. The complex amplitude of the target, measured in correspondence with the peak (6 Hz and 12 m), provides the estimation of the complex contribution P of FIG. 1B. The estimation of the vector I, on the other hand, is given by the complex contribution P measured at null frequency.

A further example of application of the method according to the invention was effected by equipping a vibration actuator (shaker) having wide-range frequencies with a target visible to the radar system, in order to verify the sensitivity of the same radar system to the variation in frequency and therefore to effectively and accurately calibrate the receiving and calibration device 10.

FIG. 6 shows an example of a verification system of the performances of the calibration method according to the invention. The verification system effects an estimation of the vibration of a target assembled on a precision actuator (shaker) for measurement tests of the vibrations with a variation in the "sweep frequency".

Finally, FIGS. 7A and 7B show the results of radar estimations of two known vibrations equal to 90 Hz and 590 Hz with respect to a reference accelerometer. The optimum vibration frequency of the calibration target, object of the method according to the invention, can be accurately determined thanks to the measurements indicated.

It can thus be seen that the method and kinematic calibration system for the measurement of displacements and vibrations of objects/structures according to the present invention achieve the objectives previously specified.

The method and kinematic calibration system for the measurement of displacements and vibrations of items/structures of the present invention thus conceived, can in any case undergo numerous modifications and variants, all included in the same inventive concept. The protection scope of the invention is therefore defined by the enclosed claims.

The invention claimed is:

1. A method for measuring, at a processor of a radar device (Q), displacements and vibrations of an object/structure (P), the method comprising:
   transmitting at least one radar wave by the radar device (Q) placed at a predefined distance (R) from a receiver device on the object/structure (P);
   receiving, by the radar device (Q), a complex signal (s(t)) consisting of a sum of a signal reflected from said receiver device and of one or more interfering signals (I) generated by one or more corresponding targets ($I_1$, $I_2$) substantially stationary and substantially positioned at the same distance (R) from said radar device (Q); and
   separating, at the radar device (Q), the one or more interfering signals (I) from said reflected signal, the separating including calibrating based on
      inducting, for a pre-determined period of time, a vibrational motion having a known frequency and duration in the receiver device, which consequently operates as a calibration device, for obtaining an estimated value of said one or more interfering signals (I),
      subtracting the estimated value of said one or more interfering signals (I) from the complex signal (s(t)), in order to eliminate said one or more interfering signals (I); and
      obtaining an entity of the displacement of the object/structure (P) on the basis of the calibrated reflected signal.

2. The method according to claim 1, wherein a value of the displacement of the object/structure (P) is calculated on the basis of a variation, as a function of time, of the distance ($R_{LOS}(t)$) between the radar device (Q) and the object/structure (P).

3. The method according to claim 2, wherein the distance ($R_{LOS}(t)$), as a function of time, between the radar device (Q) and the object/structure (P) is equal to:

$$R_{LOS}(t) = \frac{\varphi(t)}{4\pi}\lambda$$

wherein $\varphi$ is the phase of the received signal, after demodulation, and $\lambda$ is a length of the radar wave.

4. The method according to claim 3, wherein the phase $\varphi$ is periodically measured, with repetitions of transmissions, in correspondence with the times $t_n$ equal to:

$$t_n = \frac{2R}{c} + nT$$

wherein R is the distance of the object/structure (P) from the radar device (Q), c is an electromagnetic propagation rate, T is a repetition period of the radar signal and n is an integer index.

5. The method according to claim 4, wherein the measurement of the phase $\varphi$ allows the variation in the distance ($R_{LOS}(t)$), as a function of time, between the radar device (Q) and the object/structure (P) to be known for multiple time intervals of the repetition period T.

6. The method according to claim 1, wherein the calibrating is periodically repeated in order to update the estimated value of said one or more interfering signals (I) with respect to possible changes in interference.

7. The method according to claim 6, wherein estimating a vibration of the object/structure is performed following a temporary interruption of the vibrational motion induced in the receiver or calibration device.

8. The method according to claim 1, wherein the vibrational motion is a sinusoidal motion.

9. A system for measuring displacements and vibrations of an object/structure (P), the system comprising:
   at least one receiver or calibration device on the object/structure (P); and
   at least one radar device (Q) positioned at a predefined distance (R) from the at least one receiver or calibration device, the radar device (Q) including a processor configured to
      transmit at least one radar wave to said at least one receiver or calibration device,
      receive, by the radar device (Q), a complex signal (s(t)) consisting of a sum of a signal reflected from said receiver device and of one or more interfering signals (I) generated by one or more corresponding targets ($I_1$, $I_2$) substantially stationary and substantially positioned at the same distance (R) from said radar device (Q), and
      separate, at the radar device (Q), the one or more interfering signals (I) from said reflected signal,
   wherein preforming the separation, the processor is further configured to
      induct, for a pre-determined period of time, a vibrational motion having a known frequency and duration in the receiver device, which consequently operates as a calibration device, for obtaining an estimated value of said one or more interfering signals (I),
      subtract the estimated value of said one or more interfering signals (I) from the complex signal (s(t)), in order to eliminate said one or more interfering signals (I), and obtain an entity of displacement of the object/structure (P) on the basis of the calibrated reflected signal, wherein said at least one receiver or calibration device comprises
- a reflector element visible to the radar device (Q);
- an anchor configured to integrally connect said at least one receiver or calibration device with the object/structure (P); and
- a vibration mechanism which allows said receiver or calibration device to be moved with its own motion with respect to the object/structure (P).

10. The system according to claim 9, wherein the vibration mechanism is equipped with an electric motor fed by a battery and with a cam, and is capable of generating a vibrational motion of a sinusoidal type.

* * * * *